United States Patent [19]
Donahoo

[11] 3,983,621  
[45] Oct. 5, 1976

[54] METHODS OF MAKING FRACTIONAL HORSEPOWER MOTORS

[75] Inventor: Joe T. Donahoo, Fort Wayne, Ind.

[73] Assignee: General Electric Company, Fort Wayne, Ind.

[22] Filed: Oct. 21, 1974

[21] Appl. No.: 516,594

[52] U.S. Cl. .................................. 29/596; 29/609; 83/32; 310/42; 310/216; 310/254
[51] Int. Cl.² ........................................ H02K 15/02
[58] Field of Search ..................... 29/596, 598, 609; 310/42, 216, 254, 259, 172; 83/32

[56] References Cited
UNITED STATES PATENTS

| | | | |
|---|---|---|---|
| 1,635,064 | 7/1927 | Wagner | 29/609 |
| 1,917,289 | 7/1933 | Benson | 310/172 |
| 2,807,735 | 9/1957 | Naul | 310/172 |
| 3,024,377 | 6/1962 | Tupper | 310/172 |

*Primary Examiner*—Carl E. Hall
*Attorney, Agent, or Firm*—Ralph E. Krisher, Jr.

[57] ABSTRACT

One disclosed method involves punching winding leg and yoke laminations from a strip, subsequently forming a core yoke section, and forming a core winding leg (or coil core). Thereafter, an excitation coil is supported on the coil core, and the coil core and core yoke are assembled in reoriented relation relative to the relative orientation of the laminations when punched from the original strip. The winding leg laminations are reoriented 180 degrees, about a longitudinally extending axis, so that a first surface of the original strip material which faces one direction, as it is punched from the strip, faces an opposite direction in the winding leg section in a finished motor.

The geometrical configuration of the laminations prevent a random location of the winding legs relative to the yoke laminations, yet permits two distinctly different relative lamination orientations. A longitudinal reference line along the winding leg is identified, and keying or interlocking means symmetrical about the reference line are provided, but the winding accommodating portion of the winding leg is asymmetrical about the same reference line. Therefore, two distinct winding window openings may be provided, depending on the orientation of the winding leg.

1 Claim, 6 Drawing Figures

METHODS OF MAKING FRACTIONAL HORSEPOWER MOTORS

BACKGROUND OF THE INVENTION

The present invention relates generally to electrical devices having wound coils for excitation thereof, and, more particularly, to methods of making fractional horsepower electric motors.

One of the less expensive types of electric motors are conventionally referred to as "skeleton" or "C-type" motors. These motors typically are of small horsepower and conventionally are provided with a generally U-shaped or C-shaped yoke section which has a rotor receiving bore in the bight portion of the yoke. A core section, adapted for accommodating a wound coil or excitation winding thereon, is provided to bridge the leg portions of the yoke so as to complete a magnetic circuit for the stator. One particular construction that has been used extensively by applicant's assignee is shown and described in Tupper's U.S. Pat. No. 3,024,377 which issued Mar. 6, 1962, and which is assigned to the assignee of the present application.

As pointed out in the just-referenced Tupper patent, it is important that the coil supporting core section (winding leg) be rigidly maintained in fixed relation to the yoke leg portions so as to avoid the introduction of more than a minimum of interference or magnetic reluctance into the flux path along the interfaces of the winding leg and adjacent leg portions of the yoke. The type of winding leg laminations shown and described in the Tupper patent has become known in the industry as a "dog-bone" lamination. This type of lamination is provided with an elongate winding portion and two enlarged ends. Elongate portions having enlarged ends are also shown in the Naul U.S. Pat. No. 2,807,735, which issued Sept. 24, 1957.

With both of the approaches just mentioned, winding leg laminations may be produced from a strip of material substantially at the same time that yoke section laminations are produced; with the different laminations being punched from the strip in a nested relationship. With the Tupper approach, relative small amounts of scrap are produced because of this nested relationship.

Over the years, there has arisen a need to increase the power delivery capability of many of the existing skeleton motor designs. The demand for and expected production volumes for such increased capability motors, in many cases, have not justified the expenses of providing a completely redesigned motor and associated tooling. Thus, for many designs (including those of Tupper) such demand has been met by producing motors of increased stack heights or lengths.

In more recent years, it has become desirable to increase the number of winding turns, or to use aluminum windings rather than copper windings. Use of aluminum has become increasingly important with increasing material shortages, and with increasing differentials between prices of copper and aluminum. In either case, more "winding window" space is usually required, i.e., the space or "window" between the winding leg and bight portions of the stator yoke.

One of the present practices for providing larger winding windows for dog-bone skeleton motors is to discard the dog-bone winding leg laminations that are punched in nested relation with the yoke section; and punch separate winding leg laminations that will provide a larger winding window.

Another alternative to the one just mentioned would be to provide two different complete core designs, one of which would be used when "small windows" were needed, and the other when "large" winding windows were needed. However, this approach would require an initial tooling expense or investment for each design as well as maintenance and replacement expenses for such tooling.

It might be suggested that a more desirable approach would be to redesign existing motor laminations so that a single, larger winding window would always be provided, and then use such redesign even for applications that needed smaller winding windows. This approach would cause other problems however because the overall size of the resulting motors (including windings) would often be larger than motors in the field, and the physical interchangeability of replacement motors might not be possible. Moreover, because of the somewhat greater overall physical size of such motors, it would be necessary (in at least some instances) for appliance manufacturers to modify their products design in order to accommodate the larger motor. This of course would be contrary to the trend toward reduced product sizes.

Accordingly, it would be extremely desirable to provide new and improved motors and methods of making the same, whereby such motors: could be utilized as a direct replacement for small motors that were manufactured heretofore; would have an overall physical configuration that would fit within existing designs of appliances and other devices; and yet in which large winding windows could be provided without the need to scrap substantial amounts of lamination material, and to use in lieu thereof specially made winding leg laminations.

SUMMARY OF THE INVENTION

Accordingly, it is a general object of the present invention to provide a new and improved methods of making fractional horsepower motors, that overcome various ones of the above-mentioned problems.

A more specific object of the present invention is to provide methods of making an improved fractional horsepower motor, and laminations for use therein, such that the same winding leg laminations may be oriented relative to the yoke section so as to optionally provide a winding window of a first size or of a second, relatively larger, size.

In carrying out the above and other objects in a preferred form thereof, I provide a method of making motors that involves punching winding leg and yoke laminations from a strip of material, subsequently assembling a number of yoke laminations to form a core yoke section, and assembling winding leg laminations so as to form a core winding leg. Thereafter, I support an excitation coil on the core winding leg, and assemble the core winding leg with the core yoke section in a relative spatial relationship that is inverted or reoriented relative to the relative orientation of the laminations when they were punched from the strip of material. For example, the winding leg laminations are reoriented 180°, about a longitudinally extending axis, so that a first surface of the original strip material faces one direction in the core yoke section, and an opposite direction in the winding leg section in a finished motor.

In one preferred form of the invention illustrated herein, I provide a method of making a motor design having yoke laminations that are somewhat similar, but not identical, to those utilized heretofore. However, the winding leg laminations have enlarged end portions that mate with the legs of the yoke laminations in a novel fashion. The geometrical configuration of the laminations prevent a mere random location of the winding legs relative to the yoke pieces, and yet two distinctly different relative lamination orientations are permitted. A longitudinal reference line along the winding leg is identified, and a projection symmetrical about the reference line establishes a desired keying between a yoke core section and winding leg core section. The longitudinally extending winding accommodating portion of the winding leg is in effect, "offset" relative to the reference line. In a more preferred exemplification, I provide methods of making a new and improved motor including a U-shaped core yoke section and a dog-bone core section. The dog-bone type winding leg laminations key or interlock with the yoke laminations; and have end projections that are offset relative to a line extending centrally along the leg, but that are symmetrical about a longitudinally extending reference line. With the offset surface portions symmetrical (one relative to the other) about a reference line, they may be oriented 180° about such reference line. However, since the major portion of the winding leg is asymmetrical about the same reference line; two distinct winding window openings may be provided, depending on the orientation of the winding leg.

The subject matter which I regard as my invention is particularly pointed out and distinctly claimed in the concluding portion of the specification. The invention itself however, both as to organization, mode of operation and preferred forms of practicing the same; together with further advantages thereof, will be better understood by reference to the following description taken in conjunction with the accompanying drawings wherein like reference numerals have been used to denote like parts.

DESCRIPTION OF THE PREFERRED EMBODIMENT

Figure 1:
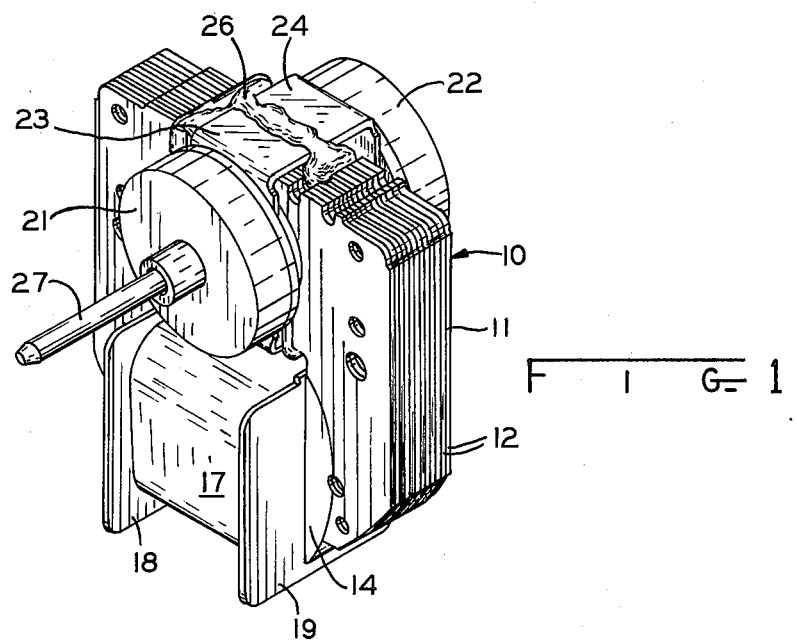
FIG. 1 is a view in perspective of a motor that would be made by practicing the invention in one preferred form thereof.

Turning now to the drawings in more detail, in FIG. 1 I have shown a fractional horsepower motor 10 of the well-known skeleton or C-frame type. It will be noted that the motor 10 comprises a first generally C or U-shaped core section 11 that is made of a plurality of individual generally C or U-shaped laminations 12, and a coil core section 14 which also comprises a plurality of individual laminations which are better revealed in FIG. 2 and denoted therein by the reference numeral 16.

Still referring to FIG. 1, the motor includes a wound coil (covered by insulating tape 17) which is confined between insulating, winding retaining flanges 18, 19. This particular type of structure is clearly shown and described in detail, along with innovative ways of making an insulative wound core and coil assembly in Church U.S. Pat. No. 3,709,457 which issued Jan. 9, 1973 and which is assigned to the assignee of the present application. For further description and detail of the wound coil, retaining flanges 18, 19, and so forth, the reader is referred to the Church patent, and the entire disclosure of that patent is incorporated herein by reference.

The motor 10 also includes a rotor, substantial portions of which are hidden from view by the oil reservoir covers 21, 22 which may be snapped onto the end frames or brackets 23, 24. Details of suitable oil reservoir covers are described in Wendt et al. U.S. Pat. No. 3,500,087 as well as in Church U.S. Pat. No. 3,743,871; both of which are assigned to the present assignee and the entire disclosures of which are also incorporated herein by reference.

The bearing brackets 23, 24 have been illustrated as being secured to the laminations 11 by an epoxy adhesive material 26. The protruding shaft 27, which forms part of the rotor assembly, rotates in bearings that are supported by the bearing brackets 23, 24, all as will be understood by persons having ordinary skill in the art.

Figure 2:
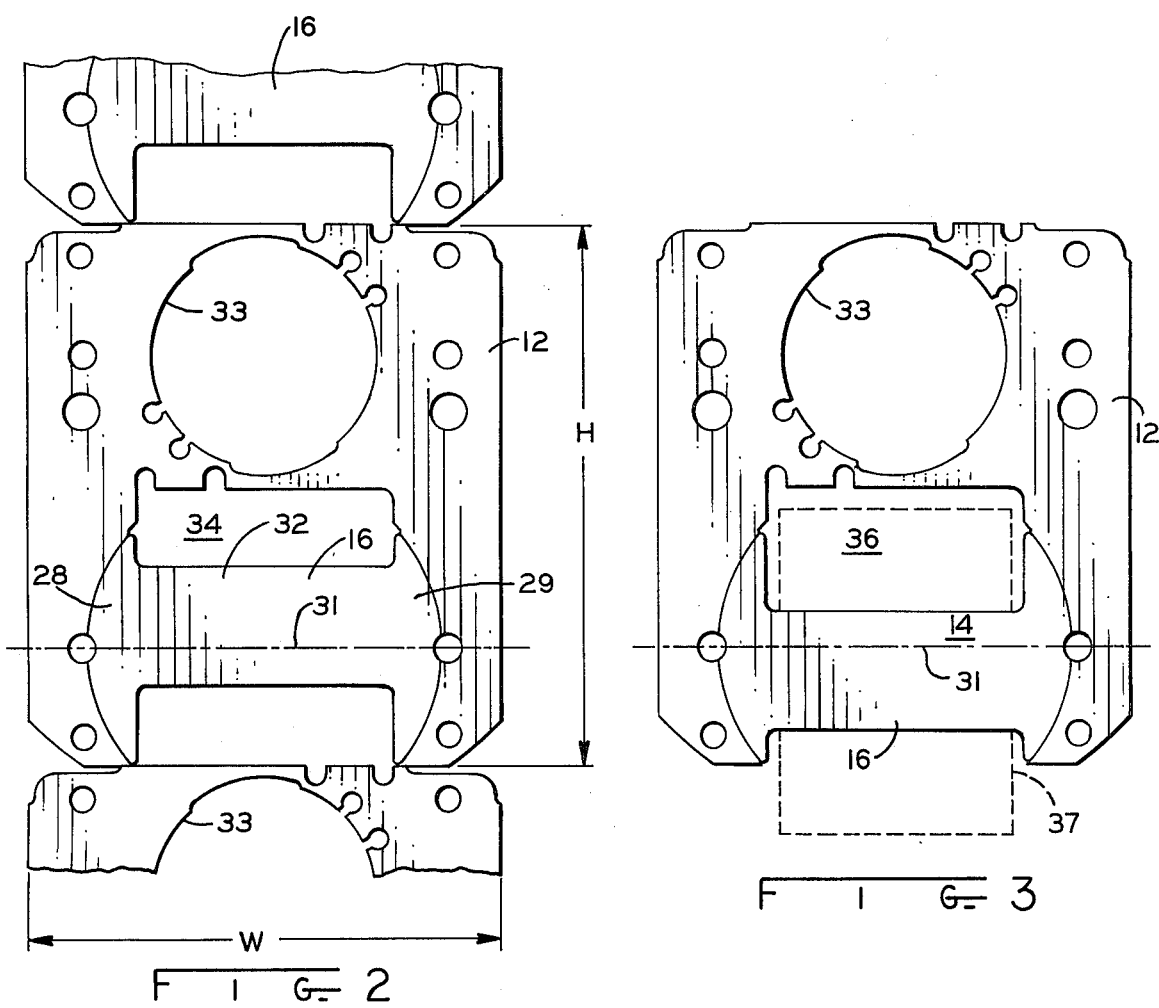
FIG. 2 illustrates the relationships of portions of a series of laminations as they would be punched from a strip of lamination material.
Figure 3:
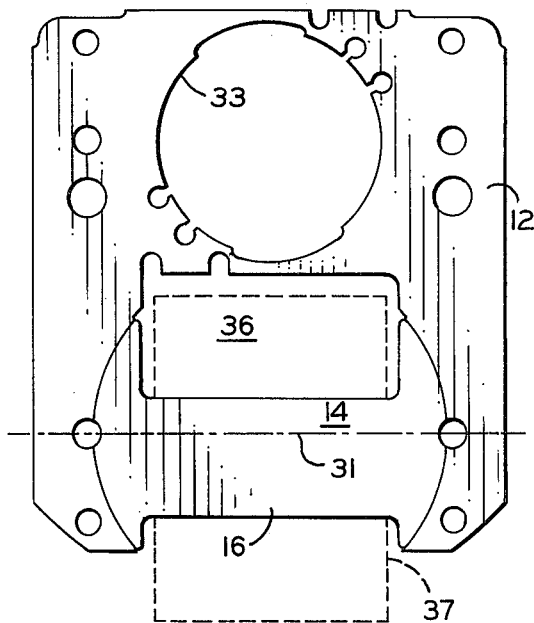
FIG. 3 is a plan view of a core of the motor of FIG. 1, with coil or winding leg portions (as shown in FIG. 2) oriented to provide a large winding window.

With reference now to FIG. 2, it should be noted that the laminations 12, 16 are configured so that they have interlocking means that are more specifically described as including enlarged ears or projecting portions 28, 29 on each lamination 16. These enlarged projections have surfaces that interface with substantially congruent surfaces of laminations 12. The congruent surfaces and the portions 28 and 29, are symmetrical (as viewed in FIG. 2) about a reference line that has been identified by the dashed line 31. Although the interfaces of the winding legs 16 and yoke lamination 12 are symmetrical about the reference line 31, it is to be noted that the actual winding accommodating portion 32 of each lamination 16 is offset (and thus asymmetrical) relative to reference line 31. When lamination 16 is reoriented 180° about the reference line 31, the major portion of the winding leg is disposed on the side of line 31 remote from the rotor accommodating bore 33 of laminations 16. FIG. 3 illustrates the lamination 12 and a lamination 16 after such reorientation has been made.

It will be understood that stator cores are fabricated first by arranging a stack of laminations 12 to establish a desired yoke section of a core, and a number of laminations 16 are arranged together in order to provide a coil core or leg. Depending upon the amount of wire that is disposed about the leg of the laminations 16, the coil core laminations 16 will be assembled together with the core yoke section so that they are relatively oriented either as shown in FIG. 2 (to provide a small winding window 34), or as shown in FIG. 3 (to provide a large winding window 36). The motor illustrated in FIG. 1 has a large winding window, the coil disposed thereupon is of aluminum, and the laminations 16 and 12 are oriented relative to the yoke laminations 12 as shown in FIG. 3.

I have determined that the performance of the motor 10 is not in any way adversely affected by reorientation of the lamination 16. In order to establish this, I have constructed motors from laminations as shown in FIG. 2, and wound a number of winding turns on the winding leg that could be accommodated in a small winding window 34. The motor was first tested with the coil core oriented to provide a small window opening; and then retested after the coil core had been reoriented relative to the yoke in the manner shown in FIG. 3. Data obtained from the two tests showed that there was substantially no difference in performance during each of these two tests.

It will be noted that, since the end frames or bearing brackets 23, 24 extend into the winding window region, the full area of window 34 (see FIG. 2) is not available to accommodate winding turns. However, this also is true of the winding window 36 (see FIG. 3). To give an indication of relative sizes, however, I have found that when the laminations 12 of the yoke section of motor 10 had a width W (see FIG. 2) of about 2.4 inches, and a height H of about 2,46 inches; window 36 would accommodate at least twice as many winding turns of a given diameter of winding conductor as would window 34. It therefore should now be understood that it would be possible to produce motors with aluminum windings in lieu of copper windings even though about one and two-thirds times as much space is usually needed to accommodate electrical conductor aluminum as compared to copper.

In FIG. 3 the outline of a coil has been illustrated with phantom lines 37 to show that it may be necessary to have an increased overall height of a motor when window 36 is substantially filled with winding material, because the wound coil will project beyond the ends of the legs of the yoke section (or therebelow, as viewed in FIG. 3).

Figure 5:
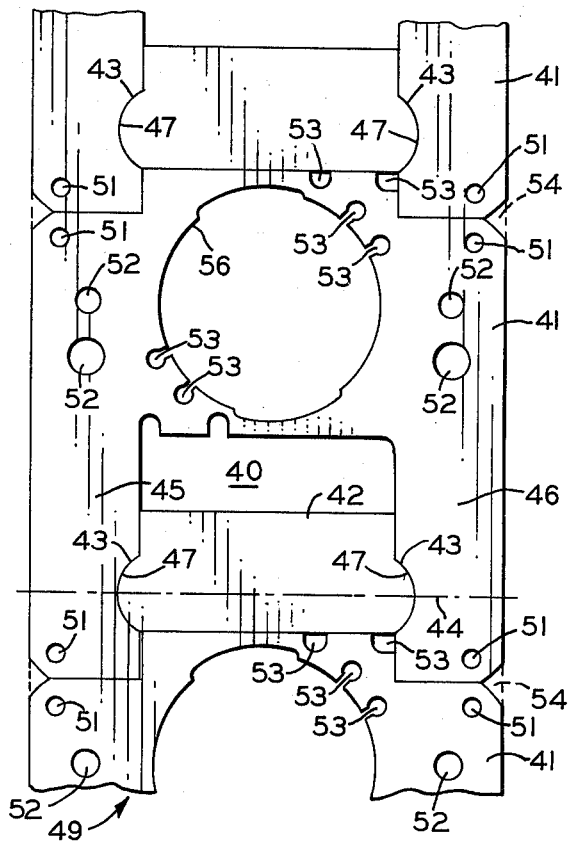
FIG. 5 illustrates the manner in which the laminations of FIG. 4 may be punched from a strip of material.
Figure 4:
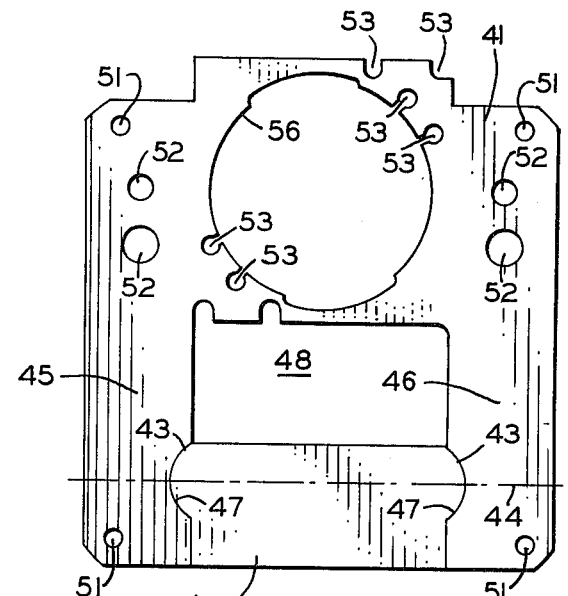
FIG. 4 illustrates still another arrangement wherein a modified coil leg is provided.

FIGS. 4 and 5 illustrate laminations 41, 42 that mutually define a winding window 40, and exemplify some aspects of the invention in another form. More specifically, I have shown yoke laminations 41 which are provided with locating or keying means in the form of surfaces or edges 43, and these surfaces or edges are substantially symmetrical relative to a reference line 44 which is substantially normal or perpendicular to the longitudinal direction of yoke legs 45, 46. Laminations 42, which subsequently are stacked to form a coil core or winding leg core section, are also provided with keying means that are in the form of edges or surfaces 47, and these means are also substantially symmetrical about the reference line 44.

However, the winding leg lamination 42, when considered in its entirety, is asymmetrical relative to the reference line 44. Therefore, when a single lamination 42 (or a stack of such laminations in a coil core) is reoriented one hundred and eighty degrees about reference line 44, and is interlocked with a lamination 41 (or yoke section comprised of a stack of laminations 41); a second, larger winding window 48 will be defined as shown in FIG. 4 (this assumes of course that laminations 42 are not also "flipped over").

It is to be noted that laminations 41, 42 are preferably punched, in nested relationship, from a strip of material 49 as represented by FIG. 5 so as to minimize scrap. When this is done, minimum scrap will usually result if the laminations 41, 42 are nested in a manner so that the initial nested, as punched, relative orientation therebetween establishes a smaller winding window. This also would be the case, of course, with the laminations shown in FIG. 2.

While on the subject of FIG. 2, it is noted that the nested lamination arrangement shown therein is for purposes of illustration only, and that in actual practice, the laminations 12, 16 would be nested in abutting relationship similar to the arrangement of FIG. 5. In that case, the top of a lamination 12 would be contoured so as to nest completely against a lamination 16.

With reference now again to FIGS. 4 and 5, it will be appreciated that substantially the only scrap from strip 49 will be that which is associated with producing winding windows 40, rivet and mounting holes 51, 52; shading coil openings 53; pieces 54, and bore 56. A large percentage of the bore material, however, is used to make a rotor.

It will be noted that a winding window of a first size is established when the sides of laminations 42, 41 that were originally the same given side of strip material 49 are facing in the same direction (e.g., facing a viewer of FIG. 4). However, a winding window of a second size results when the laminations 41, 42 are relatively reoriented so that the reverse side of one lamination faces the same direction as the obverse side of the other lamination (or cores that comprise such laminations).

While the production of different shapes of laminations from a single strip of material have been shown and described herein, it is to be understood that yoke laminations could be punched, in nested low-scrap relation from a first strip of material; and that coil core laminations could be punched from a second strip of material; all while practicing my invention in one form thereof.

In this case, the coil core legs and yoke portions still would have substantially congruent interlocking or keying portions, each of which would be substantially symmetrical about a reference line. However, the longitudinally extending portion of the resulting coil cores (as well as the corresponding portions of the coil core laminations) would be asymmetrical, or "offset" relative to the reference line extending therealong. Then, different sizes of winding windows would still be provided, depending on the relative orientation of the yoke portion of the core and the coil core in a finished motor.

Figure 6:
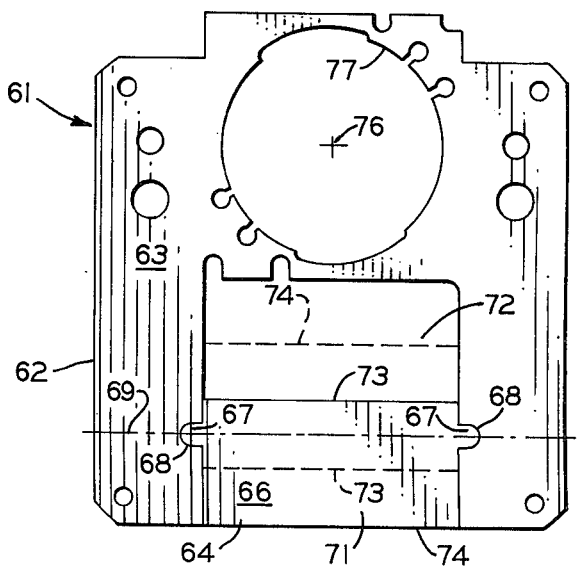
FIG. 6 illustrates still another arrangement of the wherein a different, modified coil leg or coil core is provided.

In FIG. 6, I have illustrated yet another arrangement in the form of a laminated core 61. The core 61 includes a yoke core section 62 which is made up of a plurality of laminations 63, and a coil core 64 that comprises a stack of laminations 66.

The laminations 66 (and thus coil core 64) and laminations 63 (and thus core section 62) are provided with substantially congruent interlocking means that are revealed as ears or tabs 67, and notches 68, respectively. These interlocking means are substantially symmetrical about a reference line 69, but the longitudinally extending portions 71 of laminations 66 (and thus coil core 64) between the ends thereof are generally and substantially asymmetrical relative to line 69. Thus, depending on the relative orientation of coil core 64 and yoke section 62, either a large winding window 72 will be provided, or a small window. When a small window is established, the sides or side edges 73, 74 of coil core 64 will be positioned as shown in phantom; and the major portion of coil core 64 which lies between side 74 and reference line 69, will be disposed between reference line 69 and the center 76 of bore 77.

It should be appreciated from the foregoing that I have illustrated and described a number of different modes of practicing the invention. It should also be understood that variations and modifications based on my teachings may be made in practice. Accordingly, it is to be understood that all of the foregoing description and discussion has been presented for purposes of exemplification only and not for purposes of limitation and that my invention is to be defined by the appended claims.

What I claim as new and desire to secure by Letters Patent of the United States is:

1. A method of making a fractional horsepower motor assembly, the method comprising the steps of: punching winding leg laminations and yoke laminations having a bore therein, in nested relation, from a single strip of material with a first side of the yoke laminations facing in a first direction and a first side of the winding leg laminations facing in the same first direction and with the winding leg laminations having interlocking means that are symmetrical about a reference line and a winding accommodating longitudinal section that is asymmetrical about the same reference line; processing a plurality of yoke laminations to form a core yoke section having a bore therein and processing a plurality of winding leg laminations to form a coil core; accommodating a plurality of turns of conducting material on the winding accommodating portion of the coil core; and subsequently assembling the coil core and yoke section together to establish a path for magnetic flux across the interfaces of the coil core and yoke section and supporting a rotor in the bore of the core yoke section; said method including relatively reorienting the direction in which the laminations of the coil core and the core yoke section face so that after assembly of the coil core and yoke section, the first sides of the coil core laminations face in a direction generally opposite to the direction in which the first side of the laminations of the core yoke section face.

* * * * *

UNITED STATES PATENT OFFICE
CERTIFICATE OF CORRECTION

PATENT NO. : 3,983,621

DATED : October 5, 1976

INVENTOR(S) : Joe T. Donahoo

It is certified that error appears in the above-identified patent and that said Letters Patent are hereby corrected as shown below:

Col. 1, line 66, change "winding windows" to --"winding windows"--
Col. 2, line 23, change "products" to --product's--
Col. 3, line 20, change "dog-bone" (first occurrence) to --"dog-bone"--
Col. 3, line 58, delete "of the" after "arrangement"

Signed and Sealed this

Eleventh Day of January 1977

[SEAL]

Attest:

RUTH C. MASON
Attesting Officer

C. MARSHALL DANN
Commissioner of Patents and Trademarks